(12) United States Patent
Scanlon

(10) Patent No.: US 7,656,749 B2
(45) Date of Patent: Feb. 2, 2010

(54) SYSTEMS AND METHODS FOR ANALYZING ACOUSTIC WAVES

(75) Inventor: Michael V. Scanlon, Laurel, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 54 days.

(21) Appl. No.: 11/849,996

(22) Filed: Sep. 4, 2007

(65) Prior Publication Data

US 2009/0059724 A1 Mar. 5, 2009

(51) Int. Cl.
*G01S 3/80* (2006.01)
(52) U.S. Cl. .................................................. 367/119
(58) Field of Classification Search ............ 367/87–191
See application file for complete search history.

(56) References Cited

U.S. PATENT DOCUMENTS

| | | | |
|---|---|---|---|
| 2,228,886 A * | 1/1941 | Olson ......................... | 181/158 |
| 3,715,500 A * | 2/1973 | Sessler et al. ............... | 381/191 |
| 5,913,829 A | 6/1999 | Reeves et al. ............... | 600/528 |
| 6,178,141 B1 | 1/2001 | Duckworth et al. ......... | 367/127 |
| 2006/0083110 A1* | 4/2006 | Tietjen ....................... | 367/127 |

* cited by examiner

*Primary Examiner*—Thomas H Tarcza
*Assistant Examiner*—Luke D Ratcliffe
(74) *Attorney, Agent, or Firm*—William V. Adams; Alan I. Kalb

(57) ABSTRACT

Systems for analyzing acoustic waves are provided. An exemplary system includes a housing, multiple acoustic passageways and an acoustic sensor. The housing defines an interior cavity. The multiple acoustic passageways communicate acoustically between the interior cavity and an exterior of the housing. Each of the acoustic passageways has an inlet port and an outlet port, with each outlet port being located within the housing to direct a portion of an acoustic wave to the interior cavity. The acoustic sensor is mounted within the interior cavity and is operative to receive portions of an acoustic wave directed to the interior cavity by the acoustic passageways. The acoustic sensor also is operative to provide information such as direction of arrival information corresponding to a composite waveform formed by acoustic interference, within the interior cavity, of the portions of the acoustic wave. Methods and other systems also are provided.

24 Claims, 6 Drawing Sheets

US 7,656,749 B2

SYSTEMS AND METHODS FOR ANALYZING ACOUSTIC WAVES

GOVERNMENT INTEREST

The invention described herein may be manufactured, used, and licensed by or for the United States Government.

BACKGROUND

1. Technical Field

The invention relates to acoustic sensors.

2. Description of the Related Art

Various acoustic systems, e.g., sniper detection systems, are known that incorporate the use of multiple acoustic sensors. The acoustic sensors typically are directional in nature and are oriented to acquire acoustic information about an area of interest. In operation, each of the acoustic sensors acquires information corresponding to an acoustic wave of interest and outputs a corresponding information signal for analysis. Exemplar acoustic signals are shock waves, muzzle blasts, mortar/missile launches, explosions, sirens, vehicle sounds and speech. By analyzing the signals from the various acoustic sensors, the direction of the source of the acoustic waves can be determined.

Such an acoustic system typically suffers from several inherent drawbacks. By way of example, such a system typically uses a large number of acoustic sensors to acquire the number of acoustic samples required for producing accurate estimations of the approach direction of an acoustic wave. Clearly, this can lead to increased cost and power requirements for such a system. Additionally, care must be taken to ensure that each of the acoustic sensors is placed in a proper location to form an acoustic sensor array; otherwise, analysis of acquired information can be flawed. As a further example, the acoustic responses of the acoustic sensors used in such a system typically are matched in order to reduce signal detection variations. As is known, response-matching of acoustic sensors can be tedious and expensive.

SUMMARY

Systems and methods for analyzing acoustic waves are provided. An embodiment of such a system includes a housing, multiple acoustic passageways and an acoustic sensor. The housing defines an interior cavity. The multiple acoustic passageways communicate acoustically between the interior cavity and an exterior of the housing. Each of the acoustic passageways has an inlet port and an outlet port, with each outlet port being located within the housing to direct a portion of an acoustic wave to the interior cavity. The acoustic sensor is mounted within the interior cavity and is operative to receive portions of an acoustic wave directed to the interior cavity by the acoustic passageways. The acoustic sensor also is operative to provide information corresponding to a composite waveform formed by acoustic interference, within the interior cavity, of the portions of the acoustic wave.

Another embodiment of a system comprises: means for dividing an acoustic wave into multiple portions; means for acoustically delaying at least some of the portions differentially with respect to others of the portions; and means for acoustically combining at least some of the differentially delayed portions to form a composite waveform.

An embodiment of a method for analyzing acoustic waves comprises: dividing an acoustic wave into multiple portions; acoustically delaying at least some of the portions differentially with respect to others of the portions; and acoustically combining at least some of the differentially delayed portions to form a composite waveform.

Other devices, systems, methods, features and/or advantages will be or may become apparent to one with skill in the art upon examination of the following drawings and detailed description. It is intended that all such additional devices, systems, methods, features and/or advantages be included within this description.

BRIEF DESCRIPTION OF THE DRAWINGS

Many aspects of the disclosure can be better understood with reference to the following drawings. Note that the components in the drawings are not necessarily to scale. Drawings have been simplified in many cases for clarity. Two-dimensional features can be extrapolated to three-dimensions. Representations of simple lines can also be serpentine or curvilinear in nature. Also, like reference numerals designate corresponding parts throughout the several views.

DETAILED DESCRIPTION

As will be described in detail, systems and methods are provided for analyzing acoustic waves. One embodiment of such a system uses a single acoustic sensor, e.g., a microphone, in a manner that enables the approach direction of an acoustic wave to be determined. Specifically, such a system samples an acoustic wave to produce individually-sampled waveforms. The acoustic sensor combines the individually-sampled waveforms acoustically to create a composite waveform. The composite waveform is then analyzed to determine the approach direction of the acoustic wave. In some embodiments, a reference signal is used for providing timing information and/or assessing acoustic signature variations, for example.

By using a single acoustic sensor, system complexity and cost can be reduced compared to conventional systems. A two-acoustic sensor, e.g., two-microphone, approach has been described to allow comparisons between a passively sampled composite waveform and an unmodified originating waveform. Combinations of more than one system, collocated with varying orientations, or distributed, will further enhance signature analysis and localization capabilities.

Figure 1:
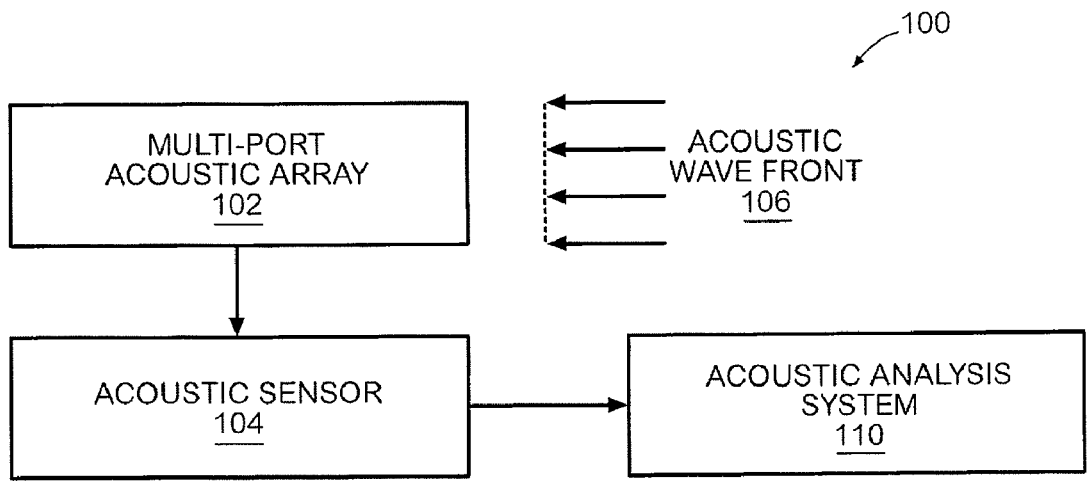
FIG. 1 is a schematic diagram of an embodiment of an acoustic localization system.

Referring now to the drawings, FIG. 1 is a schematic diagram of an embodiment of an acoustic localization system 100. As shown in FIG. 1, acoustic localization system 100 includes a multi-port acoustic array 102 that communicates acoustically with an acoustic sensor 104. As will be described in greater detail later, multi-port acoustic array 102 is configured to receive acoustic energy, such as in the form of an acoustic wave 106. The multi-port acoustic array 102 divides the acoustic wave 106 into multiple portions and then acoustically delays at least some of the portions differentially with respect to other portions. The multi-port acoustic array 102 then acoustically combines the portions to form a composite waveform. Typically, this is accomplished by directing the portions to the interior cavity of the multi-port acoustic array so that the portions can interfere with each other acoustically.

The composite waveform is detected by acoustic sensor 104, which may be a pressure transducer such as a microphone, which generates an output signal corresponding to the composite waveform. This output signal is provided to an acoustic analysis system 110 so that one or more parameters corresponding to the composite waveform can be identified. By way of example, acoustic analysis system 110 can determine an approach direction of the acoustic wave 106. Thus, a single acoustic sensor can be used to determine the approach direction of an acoustic wave. The term "acoustic sensor" refers to any type of pressure-monitoring sensor that can detect acoustic energy and, in response thereto, provide an output signal. This pressure-monitoring sensor could be a hydrophone with liquid filled passageways such as when submerged underwater, as well as an air-based microphone with gaseous passageways when used in air. A wide-bandwidth and high-sensitivity acoustic sensor will enable accurate quantification of the resulting composite waveform's subtle features.

Figure 2:
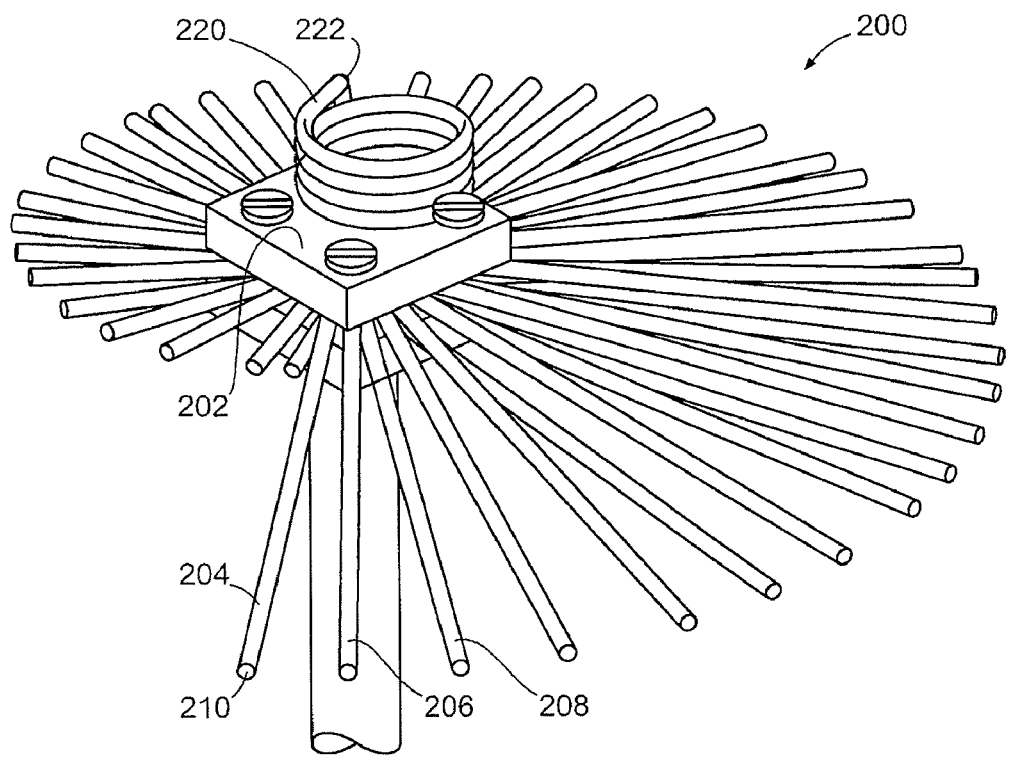
FIG. 2 is a perspective view of an embodiment of a multi-port acoustic array that can be used in an acoustic localization system.

Referring now to FIG. 2, an embodiment of a multi-port acoustic array will be described. As shown in FIG. 2, array 200 includes a housing 202. Housing 202 defines an interior cavity (not shown in FIG. 2) within which an acoustic sensor (also not shown in FIG. 2) is located. Tubes, such as tubes 204, 206 and 208, extend outwardly from the housing and form acoustic passageways through which portions of an acoustic wave can propagate. For instance, when an acoustic wave impinges upon the inlet port 210 of tube 204, a portion of that acoustic wave is directed into tube 204 and toward the acoustic sensor. These inlet ports can have flares or impedance matching properties to enhance amount of energy entering channel. The shape and orientation of these ports can also provide direction-dependent reception that further enhances the directional interpretation by applying both amplitude and timing variations to the individual ports. Note that, in some embodiments, at least a portion of an acoustic passageway can be formed by a channel or similar structure formed in the material of the housing and does not necessarily need to be straight or of circular cross section.

In the array 200, the lengths of the acoustic passageways are different from each other. Specifically, array 200 includes 48 tubes that vary in length in 0.064 inch increments from 1.356 inches to 4.380 inches. The tubes are made of thin-walled aluminum of circular cross-section, with a 0.040 inch internal diameter. Note that as the differential in length between the shorter and the longer acoustic passageways is increased, the more effectively acoustic delay variations attributable to the acoustic passageways will modify the appearance of the composite waveform formed within the interior cavity. Note, there are an infinite number of combinations of channel lengths, delay durations, numbers of channels, port geometries, dispersion patterns, and channel dimensions. An internal diameter of approximately 0.125 inches has also demonstrated excellent results. Other typical tube lengths vary from six inches to one inch incrementally by approximately one-eighth of an inch. Too long of a tube with a too small internal diameter or "channel" area will produce too much attenuation, but the larger the footprint created by longer tubes will produce more spatial separation of the sampled waveform for potentially better localization accuracy.

The inlet ports of the tubes of array 200 are located at uniform angular increments about a circumference of the array. Specifically, there is a 7.5° angular separation between adjacent tubes in this embodiment. The tubes, and corresponding acoustic passageways, function similar to Pitot-tubes, in that the tubes sample acoustic pressures located at the inlet ports. Note that the direction in which an inlet port is pointing can provide directional sensitivity for that direction.

Array 200 also includes an optional tube 220, the inlet port 222 of which is located at the center of the array. Tube 220 provides timing and reference signature information that can be useful in localizing the approach direction of an acoustic wave. In this embodiment, tube 220 provides a longer acoustic passageway than any of the other acoustic passageways of the array. The longer acoustic delay ensures that tube 220 provides a corresponding portion of the acoustic wave to the acoustic sensor of the array last. That is, after the portions of the acoustic wave provided by all the other inlet ports have been transduced at the acoustic sensor, the portion of the acoustic wave attributable to tube 220 is provided to the acoustic sensor.

By analyzing the portion of the acoustic wave provided by tube 220, timing cues and waveform shape modifications can be determined. This is because an acoustic wave propagates from one edge of the array, past the center of the array and then to the opposite edge. The portion of the acoustic wave acquired by the tube 220 timestamps the propagation of the acoustic wave over the center of the array. Identification of the portion of the acoustic wave provided by tube 220 provides information that can be compared to the composite waveform for determining timing, amplitude, phase, and/or frequency variations.

As an alternative to the coiled tube, a two acoustic sensor configuration can perform similar analysis. The coiled tube 220 with port 222 can be replaced with a free field acoustic sensor, and the unmodified signal as sensed with this acoustic sensor can be compared to the phase-modified composite waveform as sensed by acoustic sensor 304 inside cavity 302 using two channel signal analysis techniques.

In the embodiment of FIG. 2, tube 220 is configured with an inner diameter that is preferably larger than that of the other tubes. This allows tube 220 to acquire a larger acoustic reference signal than the other tubes. While the actual amplitude of the tube 220 signal is not as important as the quality of the signal, a larger diameter tube has lower acoustic impedance and allows sounds through easier and less modified. It is important to gather a reference waveform and uninterrupted time-stamp to compare to the timing and shape of the composite waveform.

In some embodiments, at least a portion of an acoustic passageway, through which a portion of an acoustic wave is directed, can be formed by a channel or similar structure formed in the material of the housing. By way of example, the channel of an acoustic passageway can be machined into monolithic materials, such as aluminum, plastic, or silicon that can be used to form such a housing. Preferably, the material of the housing attenuates acoustic energy so that acoustic energy propagating through the housing does not reduce the effectiveness of the formation of the composite waveform within the interior cavity of the housing.

Also, the length of an acoustic passageway can be varied by using bends and/or circuitous paths. For instance, the length of the tube 220 of FIG. 2 is established by coiling of the tube. Additionally or alternatively, an acoustic passageway need not be of a constant cross-section and/or shape along its length. For example, an inlet port of a tube can be flared to increase the amount of acoustic energy entering into that tube. In some embodiments, an inlet port can be directed upwards, for example, to provide omni-directional input impedance with no directional sensitivity for the corresponding acoustic passageway. Also, a windscreen can be used in some embodiments to reduce noise created by wind. In other embodiments dust covers, and semi-permeable membranes can cover the inlet ports to prevent blockage due to environmental effects.

Figure 3:
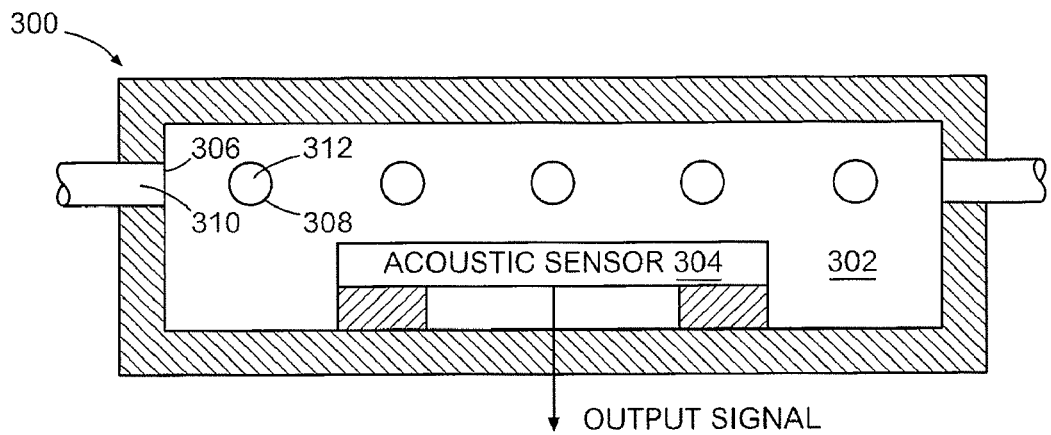
FIG. 3 is a schematic diagram showing detail of the housing and interior cavity of the multi-port acoustic array of FIG. 2.

In FIG. 3, an embodiment of an interior cavity of a multi-port acoustic array is shown schematically. As shown in FIG. 3, housing 300 defines an interior cavity 302 within which an acoustic sensor 304 is located. The acoustic sensor 304 could be part of an existing acoustic system such as a telephone, transmitter, video camera, audio recording equipment, or integrated into ground, underwater, or airborne sensor systems. Outlet ports (e.g., 306, 308) of multiple acoustic passageways (e.g., 310, 312) communicate with the interior cavity. The acoustic passageways sample, differentially delay, and then propagate portions of an acoustic wave to the interior cavity. Cross sections of acoustic passageways do not need to remain constant, and can be reduced in cross sectional area at summation region of cavity 302 to create a resistive summing network and better match the acoustic output of the summed tubes to the acoustic impedance of the acoustic sensor inlet port or cavity. It is preferred that cavity 302 be small in volume to reduce any parasitic capacitance in the summation region near sensor 304 in cavity 302.

The portions interfere with each other acoustically to form a composite waveform. The composite waveform is detected by the acoustic sensor 304, which converts the acoustic energy of the composite waveform into an output information signal that can be provided to an acoustic analysis system for analysis or be used to control some external device, such as a pan/tilt unit with an electro optic device or laser designator attached.

Outlet ports can be oriented so that portions of the acoustic wave directly impinge on the acoustic sensor or combined in the cavity and then pass through a transfer path i.e., an acoustic conduit, which may be a tube, to the acoustic sensor. This transfer path can be in a different location. Two or more such transfer paths from two or more independent devices can be summed and transduced by a single acoustic sensor to create a time-synced waveform that contains multiple solutions.

In other embodiments, various optional components can be used. By way of example, a downward-pointing conical or exponential section can be used. Advantageously, such a structure could help direct the acoustic energy toward the acoustic sensor and could reduce the parasitic capacitance associated with the relatively large volume of the interior cavity.

Figure 4:
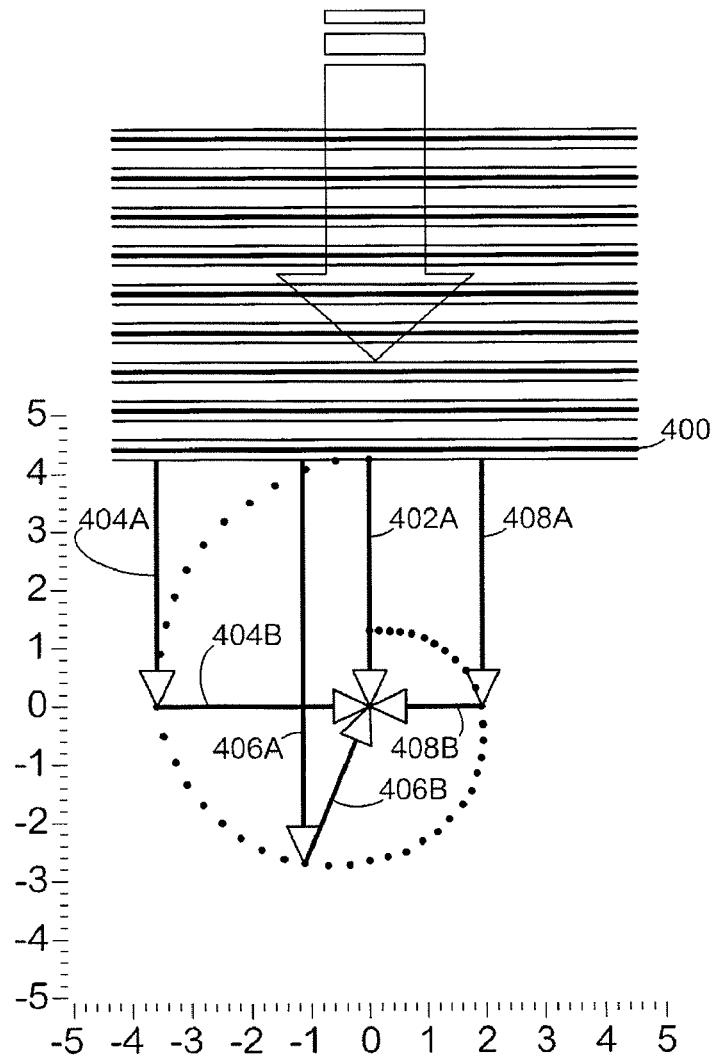
FIG. 4 is a graph depicting the acoustic travel paths associated with four inlet ports of an embodiment of a multi-port acoustic array in response to impingement by an acoustic wave.

Referring now to FIGS. 4 and 5A-5D, several aspects of the operation of an embodiment of an acoustic localization system will be described. In this regard, FIG. 4 is a graph depicting the relative locations of the inlet ports of multiple acoustic passageways of an embodiment of a multi-port acoustic array. That is, the center dot represents the location of the acoustic sensor, and each of the other dots represents an inlet port of the array. FIG. 4 also depicts an acoustic wave 400 with an approach direction of 360°. The arrows 402A, 404A, 406A and 408A represent the transmission paths traveled by the portions of the acoustic wave until reaching their respective inlet ports. The arrows 404B, 406B and 408B represent the portions of the acoustic wave after being divided and directed to the center of the array by the acoustic passageways. Thus, the distance traversed by each portion includes the path length of the acoustic passageway through which that portion travels, as well as the distance through free space through which that portion propagates until reaching an inlet port. (measured from the time the acoustic wave impinges upon the first inlet port). Note in FIG. 4 that only information corresponding to the ports located at 360°, 270°, 180° and 90° is depicted.

Figure 5B:
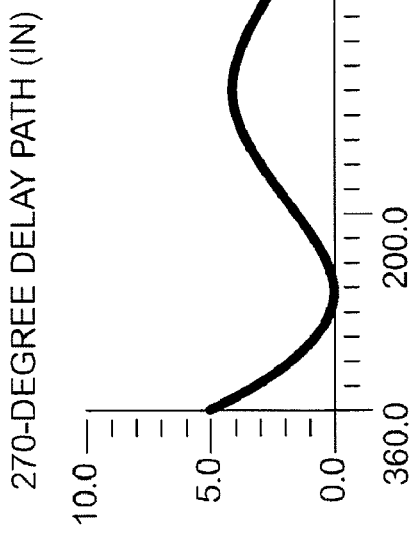
FIGS. 5A through 5D are graphs depicting acoustic wave arrival at each of the four inlet ports of FIG. 4, with delay lengths shown in inches.
Figure 5D:
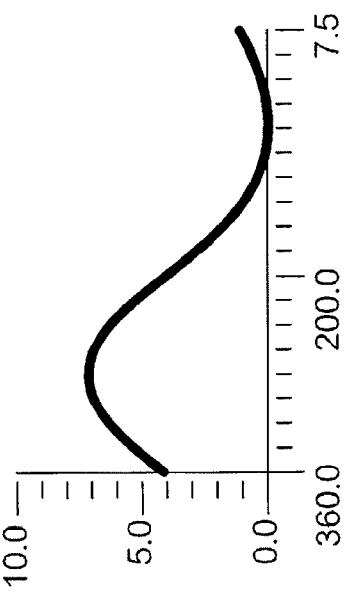
Figure 5A:
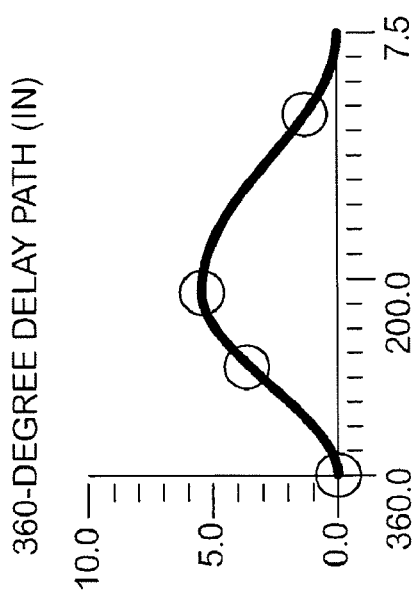
Figure 5C:
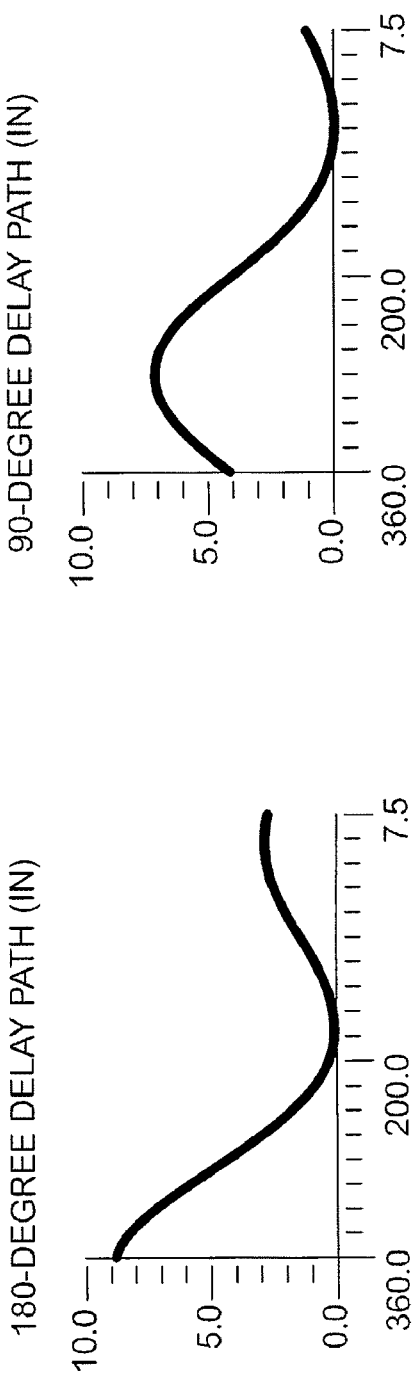
Figure 6:
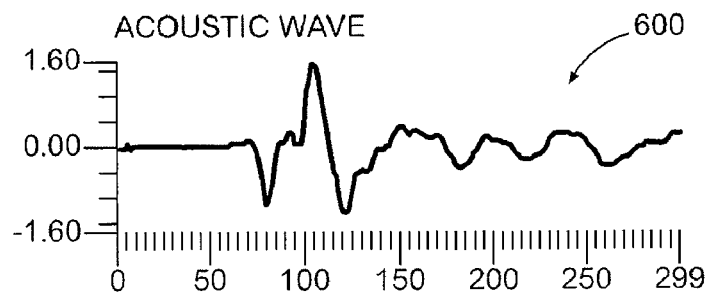
FIG. 6 is a graph depicting a representative acoustic wave.

The acoustic delay associated with each inlet port is depicted in the graph of FIG. 5A with respect to the acoustic wave with an approach direction of 360°. FIGS. 5B-5D depict similar information, with FIG. 5B being in response to an acoustic wave with an approach direction of 270°, FIG. 5C being in response to an acoustic wave with an approach direction of 180°, and FIG. 5D being in response to an acoustic wave with an approach direction of 90°.

The vertical scales of the graphs in FIGS. 5A-5D are in units of delayed inches, and are scaled similarly. Notice the amplitude, phase relationship, and shape variations associated with the four arrival directions shown. FIG. 5B shows path length delays between 0.0 inches and 5 inches for the 270° arrival direction, whereas FIG. 5C shows path length delays between 0.0 inches and 9 inches for the 180° arrival direction. This clearly demonstrates how the combined effect of adding the delays either elongates or shortens the composite waveform. It should be noted that any random pattern of tube orientations and lengths could be documented with similar "delay vs. angle" curves. Resulting composite waveforms for such a random pattern can be interpreted to match for the highest probability of the calibrated arrival direction curves. It is preferred in this embodiment, however, to have a predictable signature variation due to a controlled incremental design variance with respect to angle of arrival.

Figure 7A:
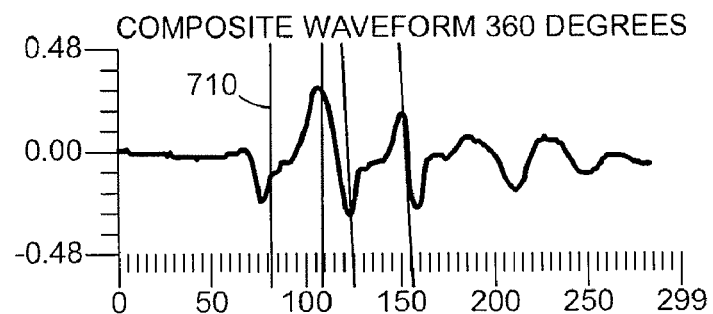
FIGS. 7A-7D depict composite waveforms generated by an embodiment of an acoustic localization system in response to receiving the acoustic wave of FIG. 6 from various approach directions.
Figure 7B:
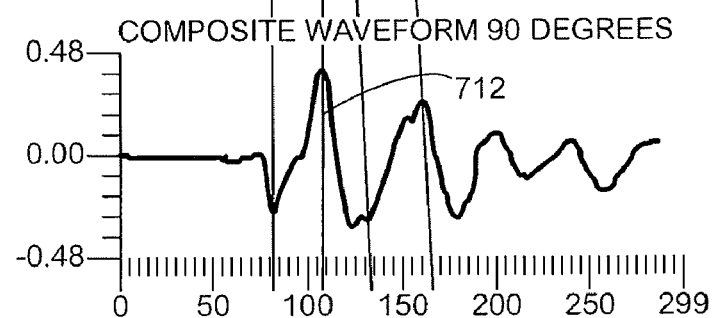
Figure 7C:
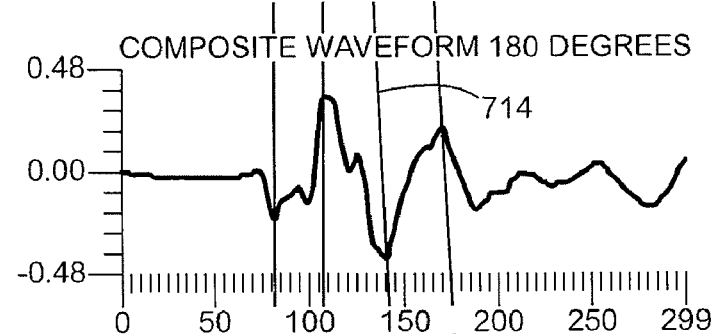
Figure 7D:
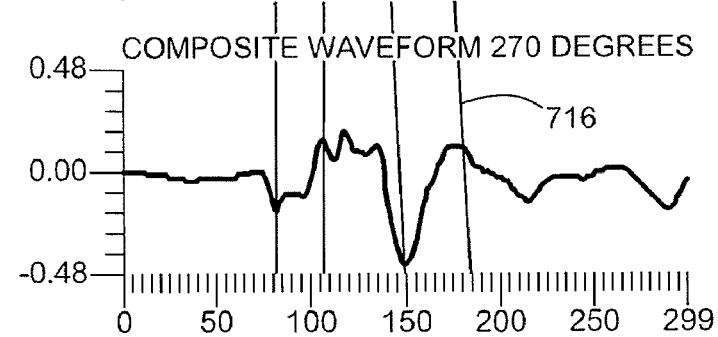

Referring now to FIG. 6 and FIGS. 7A-7D, a representative acoustic wave 600 and corresponding composite waveforms are depicted. In particular, FIG. 7A depicts the composite waveform formed in response to the acoustic wave 600 impinging an embodiment of a multi-port acoustic array from an approach direction of 360° and being affected by the delays in FIG. 5A. FIG. 7B depicts the composite waveform formed from an approach direction of 90° and being affected by the delays in FIG. 5D, FIG. 7C depicts the composite waveform formed from an approach direction of 180° and being affected by the delays in FIG. 5C, and FIG. 7D depicts the composite waveform formed from an approach direction of 270° and being affected by the delays in FIG. 5B.

In analyzing the composite waveforms of FIGS. 7A-7D, it is shown that directional variations are present that can be used to determine the respective approach directions of the acoustic wave. For instance, line 710 is aligned with the first major features, i.e., the first minima of the waveforms; line 712, is aligned with the second major features, i.e., the first maxima of the waveforms; line 714 is aligned with the third major features; and line 716 is aligned with the fourth major features. As shown, each of the lines 710, 712, 714 and 716 is angularly displaced with respect to the other lines. Therefore, by storing such information, an acoustic wave of unknown approach direction could be used to form a composite waveform that could be interpolated with respect to the previously stored information to predict an approach direction for the acoustic wave.

Phase velocity across the aperture of this device can also be used to derive an elevation solution, based on the resulting apparent increase in phase velocity that is associated with an elevated arrival direction, as measured by the total envelope of the composite signal relative to the instantaneous sound speed. Auto- and cross-correlation techniques used for echo removal or multipath effects can be applied to predict the anticipated range of delay parameters, and then scale the measured parameters to derive an arrival direction based on predicted range of values. Delay calculations using previously stated methods on several individual features of the composite waveform could provide redundant measures to refine the composite waveform's delay parameters. Other signal processing approaches such as frequency domain analysis using wavelets or Fourier transforms to determine frequency modifications associated with various composite waveforms (numerous combinations of originating waveform with different phases) can modify the fundamental frequency or relative frequency and phase relationships. The energy calculations on portions of the resulting composite waveform with respect to the originating wave can provide directional clues. Templates of anticipated sounds, such as shock waves or muzzle blasts of a bullet, can be stored for comparison to composite waveform for direction of arrival refinement and identification of source type.

In analyzing composite waveforms, amplitude and shape variations can be compared to an idealized waveshape. As an example, the acoustic shock-wave signature from a supersonic bullet has a predictable high-frequency "N-wave" shape, and the muzzle blast from the sniper's weapon has a typical low-frequency waveshape. Comparing the composite waveform measured by an array to that of an idealized waveform can produce a measurable elongation and waveshape variation. Spectral analysis of the composite waveform also can reveal spectral variations resulting from different directions of arrival, especially if compared to an additional reference acoustic sensor or a reference signature. For instance, FIGS. 7A and 7D are distinctly different in waveshape, yet still obey the linear variation from feature to feature described previously. Spectrum analysis of the waveshapes of FIGS. 7A and 7D also reveals that there are relative changes in frequency content between the two.

Figure 8:
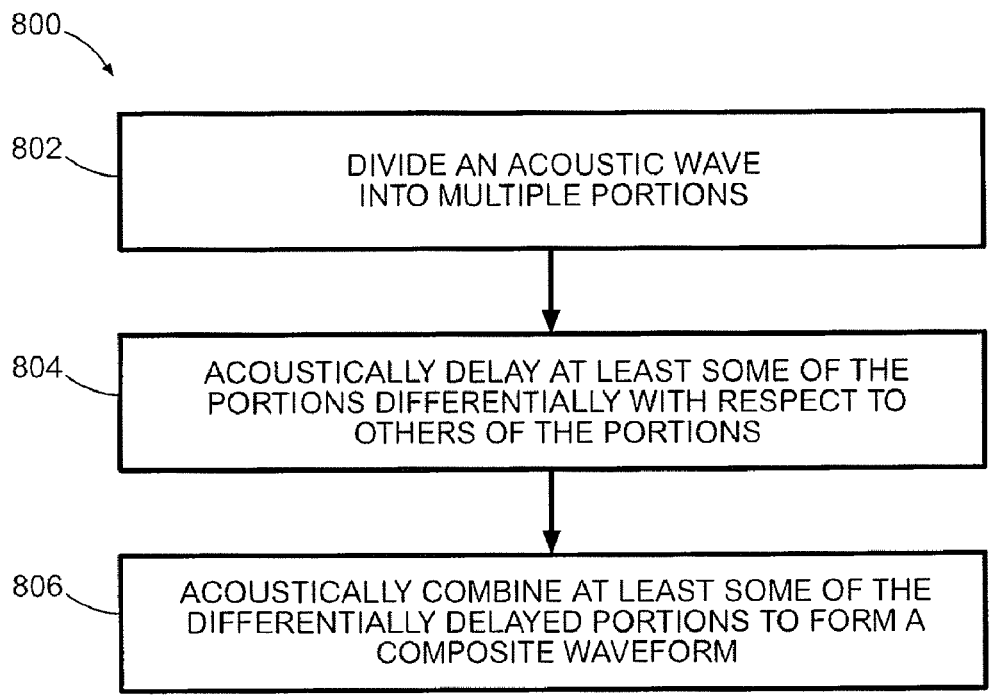
FIG. 8 is a flowchart depicting functionality of an embodiment of an acoustic localization system.

Reference will now be made to the flowchart of FIG. 8, which depicts the functionality of an embodiment of an acoustic localization system. As shown in FIG. 8, the functionality (or method) may be construed as beginning at block 802, where an acoustic wave is divided into multiple portions through spatial sampling of a freely propagating waveform. In block 804, at least some of the portions are acoustically delayed differentially with respect to each other. Then, as shown in block 806, at least some of the differentially delayed portions are combined to form a composite waveform.

Analysis of information corresponding to a composite waveform typically is accomplished by an acoustic analysis system. Such an acoustic analysis system can be implemented in hardware, software, or combinations thereof. When implemented in hardware, each of the systems can be implemented with any or a combination of various technologies. By way of example, the following technologies, which are each well known in the art, can be used: an analog to digital converter to digitize the microphone's waveform and pass the digitized waveform to a digital signal processor (DSP) or programmable gate array (PGA) for the algorithms operating within to analyze the digitized waveform, or discrete logic circuit(s) or integrated circuits having logic gates for implementing timing comparisons and logic functions upon data signals. Both example circuits would produce a resulting direction-of-arrival solution that can be communicated to other signal processing hardware or display hardware.

In those embodiments implemented in software, such an acoustic analysis system can be used with a computer. An example of such a computer will now be described with reference to FIG. 9.

Figure 9:
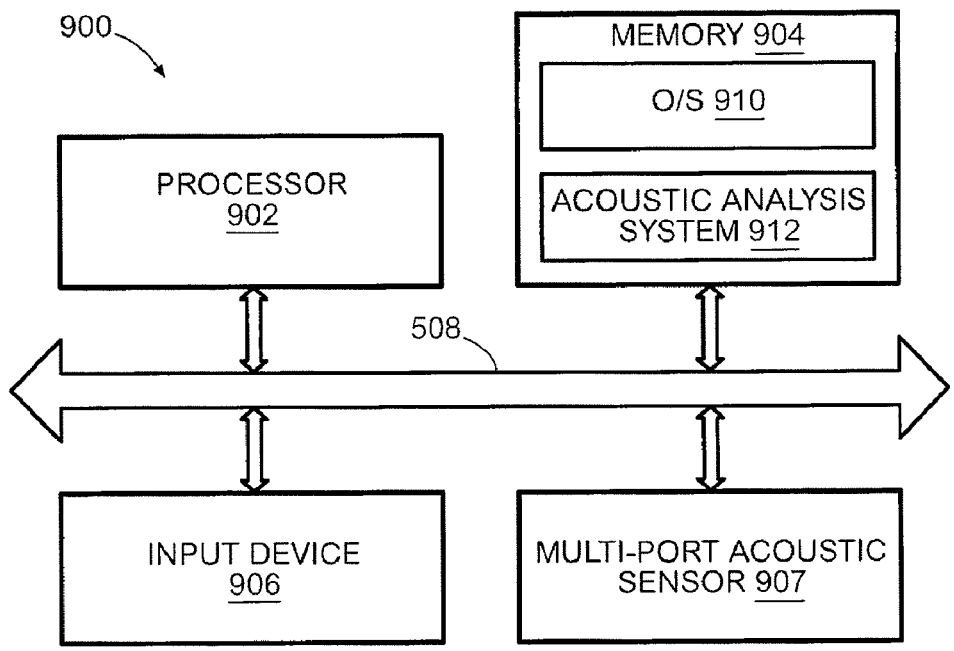
FIG. 9 is a schematic diagram of a computer or processor-based device that can be used to implement an embodiment of an acoustic analysis system.

Generally, in terms of hardware architecture, computer 900 includes a processor 902, memory 904, and one or more input and/or output (I/O) devices 906, such as a display device and/or keyboard, as well as an embodiment of a multi-port acoustic sensor. Other input and output devices can be connected to utilize resulting data from the multiport acoustic sensor, such as transmitters or motion control mechanisms. The I/O devices are communicatively coupled via a local interface 908. The software in memory 904 can include one or more separate programs, each of which comprises an ordered listing of executable instructions for implementing logical functions. In the example of FIG. 9, the software in the memory 904 includes an operating system (O/S) 910 and an embodiment of an acoustic analysis system 912.

When acoustic analysis system 912 is implemented in software, it should be noted that the input system can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. Acoustic analysis system 912 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 10:
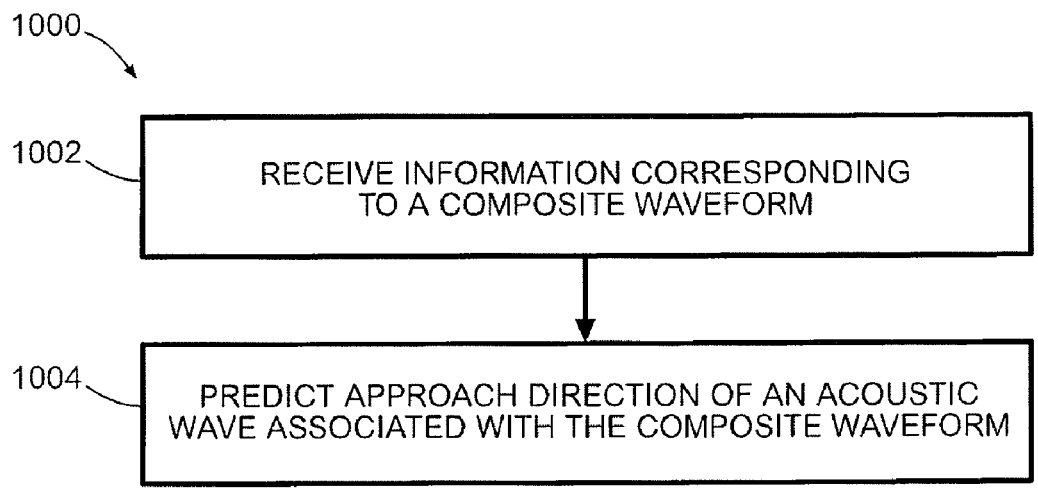
FIG. 10 is a flowchart depicting functionality of the embodiment of the acoustic analysis system of FIG. 9.

Functionality of the embodiment of the acoustic analysis system 912 of FIG. 9 is presented in the flowchart of FIG. 10. It should be noted that, in some alternative implementations, the functions noted in the various blocks of this and/or other flowcharts depicted in the accompanying disclosure may occur out of the order depicted. For example, two blocks shown in succession in FIG. 10 may be performed concurrently or, in some embodiments, in reverse order. Blocks can also be repeated in any order for an iterative approach that potentially uses feedback of results to modify the iteration path or sequences of analyses.

As shown in FIG. 10, the functionality (or method) may be construed as beginning at block 1002, where information corresponding to a composite waveform is received. Then, as shown in block 1004, an approach direction of an acoustic wave associated with the composite waveform is predicted. This prediction or calculation is based on either comparing the resulting waveform or parameters to a stored waveform or set of parameters for similarity comparisons (minimize mean-squared-error between measured and stored data to choose best arrival direction) or using a scaleable formula to relate measured features to expected timing features based on the particular number of tubes, aperture dimensions, port locations, and prior knowledge of how direction-of-arrival is modified by the geometric configuration. The angle of arrival is based on proportional timing or feature ratios when comparing the measured waveform to an expected waveform.

Figure 11:
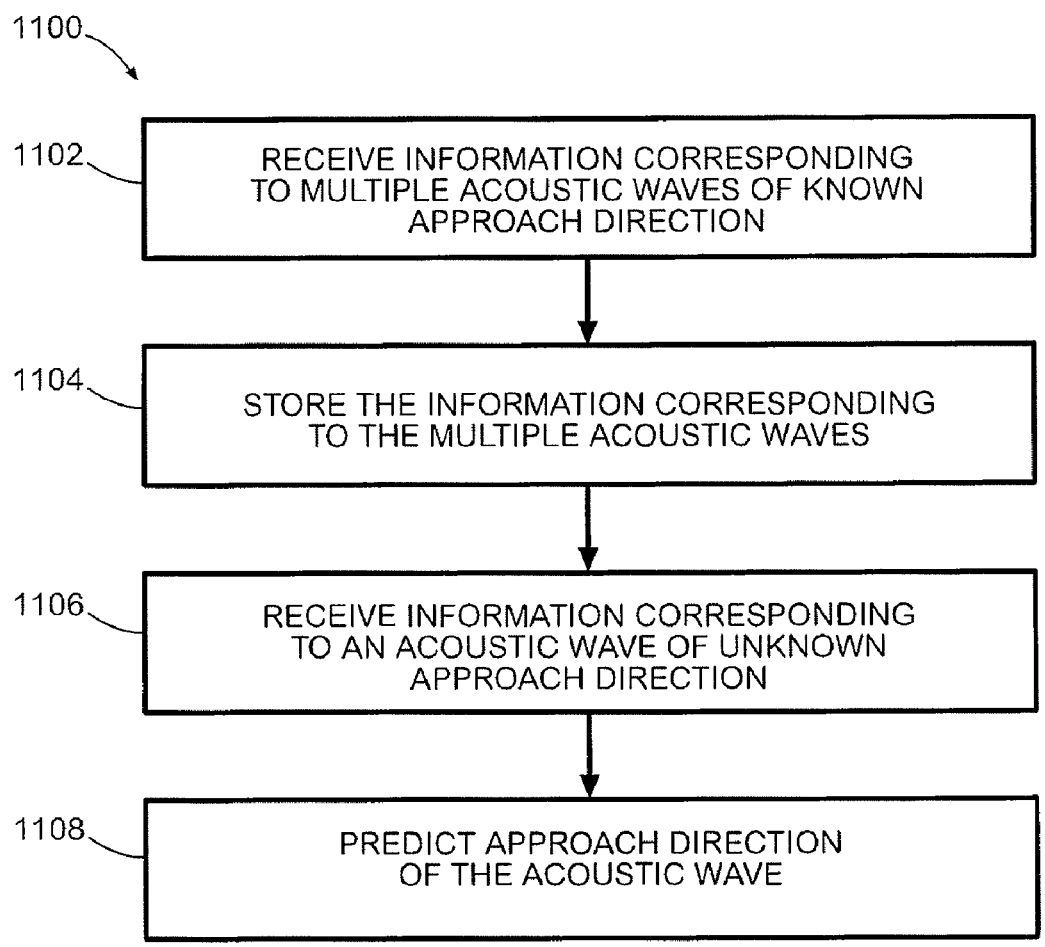
FIG. 11 is a flowchart depicting functionality of another embodiment of acoustic analysis system.

Functionality of another embodiment of an acoustic analysis system is depicted in the flowchart of FIG. 11. As shown in FIG. 11, the functionality (or method) may be construed as beginning at block 1102, where information corresponding to multiple acoustic waves of known approach direction is received. In block 1104, the information corresponding to the multiple acoustic waves is stored. By way of example, the information can be stored in memory, such as in memory 904 of computer 900 of FIG. 9. In block 1106, information corresponding to an acoustic wave of unknown approach direction is received. Then, as depicted in block 1108, an approach direction of the acoustic wave is predicted/calculated as described in the paragraph above.

Further software post-processing of the final composite waveform can reveal more details about the acoustic wave for the particular arrival direction. For example, after the arrival direction has been determined, an approximation of the acoustic wave can be recreated by using appropriate direction-of-arrival "reverse-delays" to phase-combine numerous copies of the same composite waveform to enhance the sound from that particular direction. By doing so, the resulting waveform can be similar to the original acoustic wave. Higher signal-to-noise ratio signature analysis for identification or classification can be done on the recreated signal. For instance, the signal of interest can be enhanced by directionally enhancing sounds from the determined approach direction and/or de-emphasizing sounds from other directions.

Although the embodiments described generally incorporate two-dimensional arrays, three-dimensional arrays can be used to better characterize azimuth and elevation approach directions. Such a configuration could resemble a conical tower, a spheroid, or a pyramidal structure. In such embodiments, predictable asymmetry associated with the inlet port locations and varying path lengths is preferred. It should also be noted that a two-dimensional array can extract elevation information related to an acoustic wave based on previously-described methods and the knowledge that phase velocity across an array changes with respect to elevation angle of approach.

It should also be noted that multiple arrays can be used to triangulate the source of an acoustic wave. For example, two arrays can be separated by a known distance and orientation. Each array can acquire information corresponding to a composite waveform and the information can then be correlated. Two devices collocated but oriented perpendicularly to one another can individually extract independent azimuth and the elevation solutions. As a further example, combinations of these sensors can be distributed spatially to sample the waveforms on a much larger scale, such as on the order of meters (vehicle mounted) or even hundreds of meters (ground sensor nodes). By knowing precise location and orientation of these multiple dispersed sensors permits localization of originating sound source by calculating the intersection of geolocated solution vectors.

Additional waveforms or parameters can be stored to characterize variances due to changes in temperature which causes speed of sound changes. Temperature sensor measurements are known to be useful for calculating the approximate sound speed and can be integrated into this invention to further refine the composite waveform analysis.

What is claimed is:

1. A system for analyzing acoustic waves, said system comprising:
    a housing defining an interior cavity;
    multiple acoustic passageways communicating acoustically between the interior cavity and an exterior of the housing and branching out in a plurality of directions from the interior cavity, each of the acoustic passageways having an inlet port and an outlet port, each outlet port being located within the housing to direct a portion of an acoustic wave to the interior cavity; and
    an acoustic sensor mounted within the interior cavity and being operative to receive portions of an acoustic wave directed to the interior cavity by the acoustic passageways and to provide information corresponding to a composite waveform formed by acoustic interference, within the interior cavity, of the portions of the acoustic wave.

2. The system of claim 1, wherein each inlet port is angularly displaced with respect to another.

3. The system of claim 2, wherein each inlet port is uniformly, angularly displaced with respect to each adjacent inlet port.

4. The system of claim 2 wherein each inlet port is generally located in a plane about a periphery of the housing.

5. The system of claim 1, further comprising;
    a second housing defining a second cavity;
    a second set of acoustic passageways communicating acoustically between the second interior cavity and an exterior of the second housing, each of the acoustic passageways of the second set having an inlet port and an outlet port, each outlet port of the second set of acoustic passageways being located within the second housing to direct a portion of the acoustic wave to the second interior cavity; and
    a second acoustic sensor mounted within the second interior cavity and being operative to receive additional portions of an acoustic wave directed to the second interior cavity by the second set of acoustic passageways and to provide information corresponding to a second composite waveform formed by acoustic interference, within the second interior cavity, of the portions of the acoustic wave;
    wherein the composite waveform and the second composite waveform are used to localize a source of the acoustic wave.

6. The system of claim 1, wherein each acoustic passageway has a different length.

7. The system of claim 6, wherein:
    (n) acoustic passageways extend outwardly from the housing; and acoustic passageway (m), where m is generally less than (n), differs in length from each other acoustic passageway in that acoustic passageway m is longer than acoustic passageway (m−1).

8. The system of claim 1, further comprising:
a reference acoustic passageway having an inlet port located at a center of the inlet ports of the multiple acoustic passageways.

9. The system of claim 8, wherein the reference acoustic passageway has an outlet port located at a central portion of the interior cavity.

10. The system of claim 8, further comprising a second acoustic sensor at the center of the inlet ports of the multiple acoustic passageways.

11. The system of claim 10 wherein a waveform sensed by said second acoustic sensor is compared to said composite waveform formed by acoustic interference.

12. The system of claim 1, further comprising:
an analysis system operative to receive information corresponding to the composite waveform and to determine an approach direction of the acoustic wave.

13. The system of claim 12, wherein:
the analysis system comprises a computer program stored on a computer-readable medium; and
the system further comprises a processor for executing the computer program.

14. The system of claim 12, wherein the analysis system is further operative to store information corresponding to multiple composite waveforms, the information including an approach direction for each of the multiple composite waveforms.

15. The system of claim 14, wherein the analysis system is further operative to correlate the information corresponding to the composition waveform with the information corresponding to the multiple composite waveforms such that an approach direction of the acoustic wave associated with the composite waveform is determined.

16. The system of claim 15, wherein the analysis system is operative to determine an azimuth component and elevation component of the approach direction of the acoustic wave.

17. The system of claim 12, wherein the analysis system is operative to receive information corresponding to the acoustic wave from at least two acoustic sensors mounted within respective housings, and to correlate the information to determine an approach direction of the acoustic wave.

18. A system for analyzing acoustic waves, said system comprising:

means for dividing an acoustic wave approaching from any direction into multiple portions;
means for acoustically delaying at least some of the portions differentially with respect to each other; and
means for acoustically combining at least some of the differentially delayed portions to form a composite waveform.

19. The system of claim 18, further comprising:
means for predicting an approach direction of the acoustic wave using the composite waveform.

20. The system of claim 18, wherein the means for acoustically combining comprises a single acoustic sensor operative to receive the differentially delayed portions of the acoustic wave and generate information corresponding to the composite waveform.

21. A method for analyzing acoustic waves, said method comprising
dividing an acoustic wave approaching from any direction into multiple portions;
acoustically delaying at least some of the portions differentially with respect to each other, and
acoustically combining at least some of the differentially delayed portions to form a composite waveform.

22. The method of claim 21, further comprising:
predicting an approach direction of the acoustic wave using the composite waveform.

23. The method of claim 22, wherein:
the acoustic wave is a first acoustic wave, and the composite waveform is a first composite waveform; and
the method further comprises:
dividing a second acoustic wave into multiple portions:
acoustically delaying at least some of the portions of the second acoustic wave differentially with respect to each other;
acoustically combining at least some of the differentially delayed potions of the second acoustic wave to form a second composite waveform; and
correlating information corresponding to the second acoustic wave with information corresponding to an approach direction of the second composite waveform.

24. The method of claim 23, wherein the step of predicting an approach direction of the acoustic wave comprises:
comparing the first composite waveform to the second composite waveform.

* * * * *